United States Patent
Ito et al.

(10) Patent No.: US 8,015,672 B2
(45) Date of Patent: Sep. 13, 2011

(54) TIGHTENING BAND

(75) Inventors: Naoki Ito, Chino (JP); Tomio Fushimi, Chino (JP); Noriaki Yajima, Chino (JP); Kazuhiro Fujimori, Chino (JP)

(73) Assignee: Kabushiki Kaisha Mihama, Nagano (JP)

( * ) Notice: Subject to any disclaimer, the term of this patent is extended or adjusted under 35 U.S.C. 154(b) by 855 days.

(21) Appl. No.: 10/535,496

(22) PCT Filed: Nov. 10, 2003

(86) PCT No.: PCT/JP03/14283
§ 371 (c)(1),
(2), (4) Date: Apr. 8, 2008

(87) PCT Pub. No.: WO2004/046566
PCT Pub. Date: Jun. 3, 2004

(65) Prior Publication Data
US 2009/0172924 A1    Jul. 9, 2009

(30) Foreign Application Priority Data

Nov. 18, 2002   (JP) .................................. 2002-333713
Mar. 28, 2003   (JP) .................................. 2003-091250

(51) Int. Cl.
*F16B 2/08* (2006.01)
(52) U.S. Cl. ..................................... 24/20 TT; 24/20 R
(58) Field of Classification Search ................... 24/20 R, 24/20 CW, 20 EE, 20 TT, 20 W
See application file for complete search history.

(56) References Cited

U.S. PATENT DOCUMENTS

| 4,103,399 A | * | 8/1978 | Oetiker ............................. 24/22 |
| 4,609,171 A | | 9/1986 | Matsui |
| 5,530,996 A | | 7/1996 | Calmettes et al. |
| 6,131,245 A | * | 10/2000 | Chi ................................ 24/20 R |

FOREIGN PATENT DOCUMENTS

| JP | 57-11487 | 6/1980 |
| JP | 11487/1982 | 1/1982 |
| JP | 61-236908 A | 10/1986 |
| JP | 03-209035 A | 9/1991 |
| JP | 5-57373 U | 7/1993 |
| JP | 6-330913 A | 11/1994 |
| JP | 07-198077 A | 8/1995 |
| JP | 8-232919 A | 9/1996 |
| JP | 2652136 B2 | 5/1997 |
| JP | 10-299727 A | 11/1998 |
| JP | 11-218282 A | 8/1999 |
| JP | 2000-104875 A | 4/2000 |
| WO | WO 01/04533 A1 | 1/2001 |

* cited by examiner

*Primary Examiner* — James Brittain
(74) *Attorney, Agent, or Firm* — Birch, Stewart, Kolasch & Birch, LLP

(57) ABSTRACT

An upright portion of an inner band section is inserted into an elongated hole in an outer band section, and a tab stopper of the outer band section is inserted in a cutout hole on the base end side of the upright portion. As a result, a band member is temporarily held in a ring shape. When an inner and an outer pulling claw are pulled together, a fixing hole in the outer band section engages a fixing claw of the inner band section and the tab stopper engages a stopper receiving hole. This results in the band member being fixed with its diameter reduced.

4 Claims, 6 Drawing Sheets

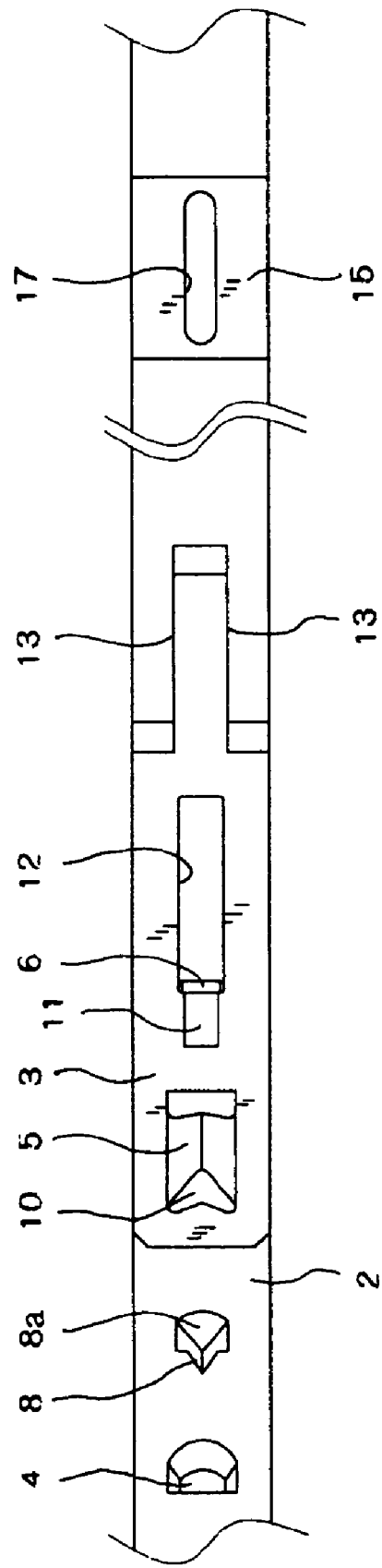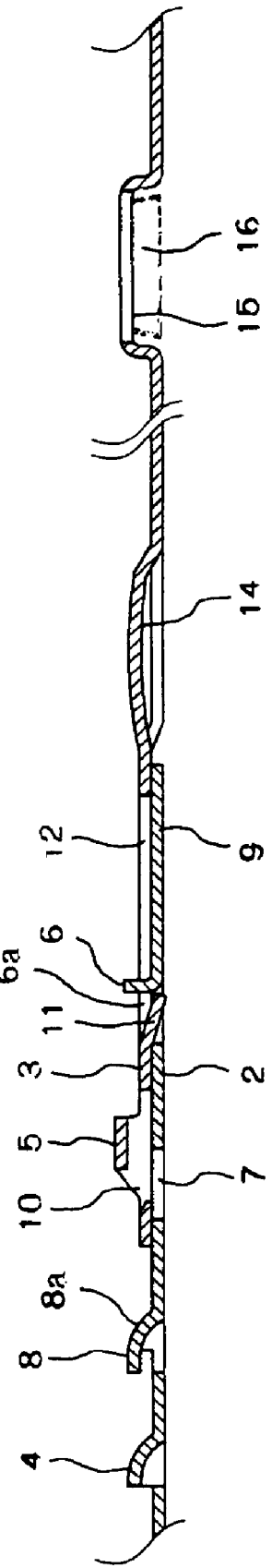

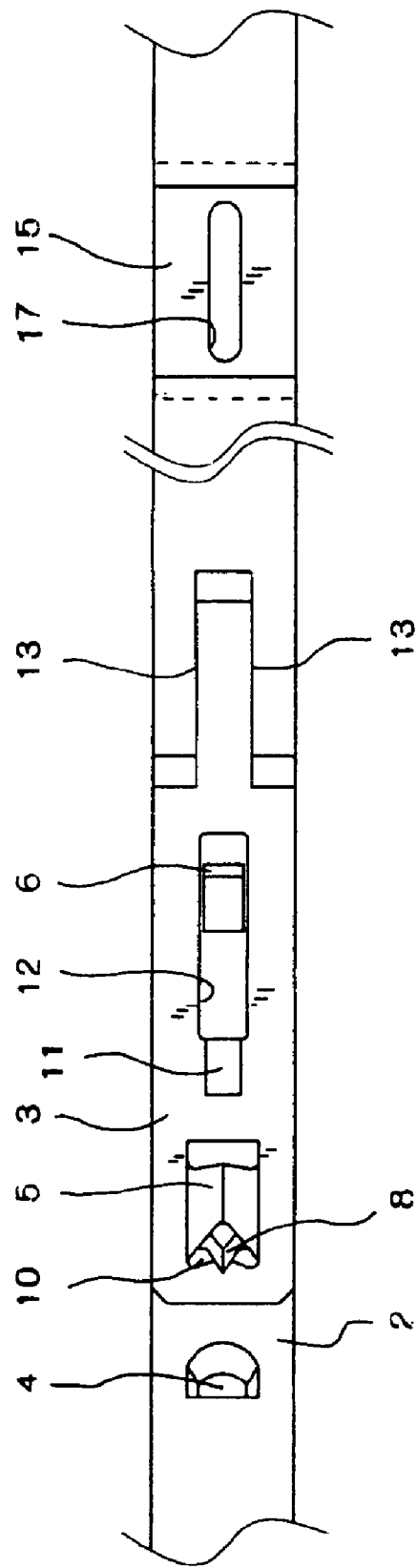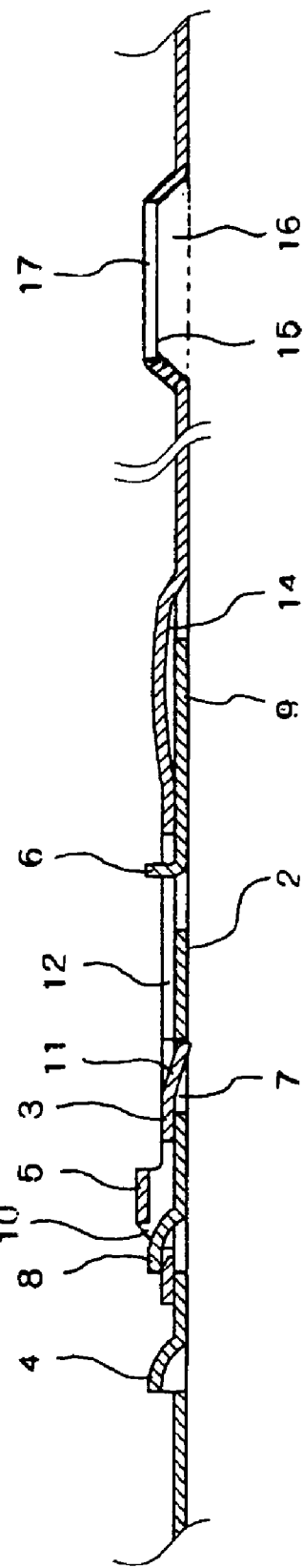

TIGHTENING BAND

TECHNICAL FIELD

The present invention relates to a tightening band that is attached to a boot or the like covering a constant velocity joint of a vehicle, and in more detail to a tightening band where both ends of a metal strip band member are overlapped and temporarily held with the band member in a ring shape and where the diameter of the band member can be reduced by using a tool to pull together inner and outer pulling claws formed so as to protrude outward on the inner band section and outer band section.

BACKGROUND ART

To avoid interference with a joint boot and other components, a so-called "pulled-together" tightening band is fixed by using a tool to pull together pulling claws formed on inner and outer band sections of a band member that has been formed in a ring shape.

For example, for the tightening band disclosed by Japanese Patent Number 2,652,136, both ends of a band member are overlapped and a fixing claw that protrudes inward on the outer band section is passed over and engages a bevel lead claw that protrudes outward on the inner band section, so that there is one engagement position. In this case, there is the risk of the tightened state becoming loose due to spring back and the like. For this reason, a first fixing claw and a second fixing claw are provided on the outer band section, a first bevel lead claw and a second bevel lead claw are provided on the inner band section, and when the pulling claws are pulled together to reduce the diameter, first the first fixing claw and the first bevel lead claw engage one another and the second fixing claw and the second bevel lead claw engage one another to fix the band sections, thereby improving the tightening force and the stability of the tightened state.

Also, when band ends of a band member that has been fitted onto the outer circumference of a boot and is temporarily held in a ring shape are pulled together using a tool such as pliers to reduce the diameter, the reactive force obtained from the tightened object when the band is tightened from the temporarily held state causes the band to return in the diameter-increasing direction, resulting in the engaging claw and the engaging hole engaging and fixing the band.

Rubber products used to be principally used as the material for boots, but in recent years resin boots formed by blow molding or the like have come into use. Compared to rubber boots, resin boots are thin with a material thickness of around 1 to 2 mm so that there is little deformation during tightening. Resin boots also exhibit high stiffness, which further inhibits deformation and as a result, it is difficult to obtain a reactive force on the band. Also to maintain a favorable seal, it is necessary to tighten resin boots with a large tightening force compared to rubber boots.

For this reason, since the reactive force from the boots is small, a tightening band that uses a construction where an elastic force builds up in the band member itself has been proposed. As examples of constructions where an elastic force builds up in the band member itself, a convex/concave section that can deform and/or holes may be formed in the band member, such as by forming a section that is V-shaped in cross section or W-shaped in cross section (see Japanese Laid-Open Patent Publication No. H7-198077) or by forming a through hole in the lengthwise direction and forming wavy sections on both sides of the through-hole (see Japanese Laid-Open Patent Publication No. H3-209035).

When the pulling claws of the tightening band disclosed by Japanese Patent Number 2,652,136 described above are engaged by a tool and clamped from the state where the band member is temporarily held in a ring shape, the first and second fixing claws that protrude inward on the outer band section pass over and engage the first and second bevel lead holes that protrude outward on the inner band section. For this reason, at the instant when the clamping force acts most strongly on the band member, the fixing claw and the bevel lead hole pass over one another and engage, so that there is the risk of top sections of the claws that protrude inward and/or outward being crushed or deformed. As a result, the engaging state of the claws becomes shallow and there is the risk of the tightening stability falling due to spring back. Also, since the overlapping band surfaces are rubbed by the claws as the diameter is reduced, when tightening and loosening operations are repeated, the top sections of the claws suffer abrasion so that clamping with a tool becomes difficult. When the tightening state is removed, both ends are released and spring outward, resulting in problems regarding handling and safety.

Since the second fixing claw and the second bevel lead claw are engaged by the diameter reducing operation after the first fixing claw and the first bevel lead claw have engaged, the stroke for pulling together the pulling claws is increased. This means that for a small-diameter tightening band, there is the risk of the band member collapsing due to the clamping.

In addition, when concave/convex sections and holes for providing an elastic force are formed in the band member itself as disclosed in Japanese Laid-Open Patent Publication No. H7-198077 and Japanese Laid-Open Patent Publication No. H3-209035, this leads to a reduction in the strength and the reliability of the band member. That is, since a large tightening force is required when the tightening band tightens an object such as a resin boot that hardly deforms, there is an increase in non-continuous sections (concave/convex sections and holes) in the circumferential direction in the band member, resulting in the risk of deterioration of the seal due to insufficient surface pressure.

Also, when the diameter of the band member that is temporarily held in the ring shape is reduced, tightening is carried out with fluctuations in tolerance for the tightened object being absorbed by a diameter reducing effect or diameter increasing effect of the band member, but since a resin boot that is a tightened object has high stiffness and hardly deforms, when the diameter is reduced there is the risk of the elastic limit of the band member being exceeded and plastic deformation occurring. Accordingly, there is the risk of the band member becoming stretched, resulting in it not being possible to achieve a strong tightening force.

The number of processes also increases and the manufacturing cost rises, and if the concave/convex section that provides an elastic force to a band member is increased, it becomes difficult to form the band member in a ring shape without deforming the concave/convex section. Fluctuations can therefore easily occur between products in dimensions such as the band diameter, resulting in the further problem of difficult handling.

DISCLOSURE OF THE INVENTION

It is a first object of the present invention to provide a tightening band with improved general-purpose applicability and durability, for which an unreasonable force is not applied to a fixing claw when the diameter of the band member is reduced and the stability in a tightened state after tightening is high.

It is a second object to provide a highly-reliable tightening band that can effectively absorb fluctuations in tolerance for the tightened object without reducing the strength or surface pressure of the band member and can achieve a restoring force required when tightening.

Tightening bands according to the present invention for achieving the first and second objects given above have the following first and second constructions.

A first construction is a tightening band where both end sections of a metal strip band member are overlapped and temporarily held with the tightening band in a ring shape and a diameter of the band member can be reduced by using a tool to pull together inner and outer pulling claws formed on an inner band section and an outer band section so as to protrude outward, wherein an upright portion formed so as to be erected outward, a stopper receiving hole, and a fixing claw are provided in that order from an end section on a part of the inner band section that overlaps the outer band section, a fixing hole, a tab stopper formed so that a tip thereof is inclined toward the inner band section, and an elongated hole that guides movement of the upright portion are provided in that order from an end section on a part of the outer band section that overlaps the inner band section, the upright portion of the inner band section is inserted into the elongated hole in the outer band section and the tab stopper of the outer band section is inserted in a cutout hole on a base end side of the upright portion so that the band member is temporarily held in a ring shape, and the inner and outer pulling claws are pulled together to cause the fixing hole in the outer band section to engage the fixing claw of the inner band section and the tab stopper to engage the stopper receiving hole, thereby fixing the band member in a state where the diameter is reduced.

Also, the tab stopper may be formed by forming cuts in a lengthwise direction at an edge of the elongated hole on the outer band end side and inclining the tip toward the inner band section.

In addition, the inner pulling claw may be formed so as to protrude outward at a position further from an inner band end than the fixing claw and the outer pulling claw may be formed so as to protrude outward between the fixing hole and the tab stopper.

A second construction is a tightening band where both end sections of a metal strip band member are overlapped and temporarily held with the tightening band in a ring shape and a diameter of the band member can be reduced by pulling together an inner band section and an outer band section, wherein a tolerance correcting member is attached to part of the band member, the tolerance correcting member tightly contacting a tightened object when the diameter of the band member temporarily held in the ring shape has been reduced and deforming to apply a restoring force for causing inner and outer band ends to return relative to one another in a diameter-increasing direction and engage one another.

When the tightening band according to the first construction described above is used, since the upright portion of the inner band section is inserted into the elongated hole in the outer band section and the tab stopper of the outer band section is inserted in a hole on a base end side of the upright portion so that the band member is temporarily held in a ring shape, the outer band end can be prevented from rising. By doing so, for the band member in the temporarily held state, the operation of engaging and pulling together the inner pulling claw and the outer pulling claw using a tool to reduce the diameter is facilitated.

In particular, the band member is fixed in the reduced diameter state by engaging the fixing hole of the outer band section with the fixing claw of the inner band section and engaging the tab stopper with the stopper receiving hole, so that concentration of the load at a fixing claw provided at a single position is avoided and the tightening load can be distributed. In this way, loosening due to spring back is prevented and the reliability of the tightening is improved.

In addition, since the tab stopper is formed so that a tip thereof is inclined toward the inner band section, when the diameter of the band member in the temporarily held state is reduced, the tab stopper contacts the inner band section and slides while elastically deforming so as to be pressed back. On reaching the stopper receiving hole, the tab stopper is inserted and engages the hole due to its own elastic force, so that there is hardly any damage, such as deformation, to the fixing claw and no abrasion of the fixing claw even after repeated use, resulting in improved durability.

In addition, the outer pulling claw is formed near the outer band end so as to protrude outward between the fixing hole and the tab stopper and the fixing claw is formed at only one position, so that it is possible to make the tightening stroke as small as possible and provide a small-diameter tightening band.

Also, by using the tightening band according to the second construction, a tolerance correcting member is attached to part of the band member, the tolerance correcting member tightly contacting a tightened object when the diameter of the band member temporarily held in the ring shape has been reduced and deforming to apply a restoring force for causing inner and outer band ends to return relative to one another in a diameter-increasing direction and engage one another. Accordingly, a restoring force of the tolerance correcting member that has deformed due to the diameter being reduced and a restoring force due to spring back of the band member itself act together. As a result, the inner and outer band ends of the reduced-diameter band member reliably spring back in the diameter-increasing direction and the tightened state of the band member can be maintained with the fixing hole and the fixing claw in strong engagement.

Also, due to a synergistic effect due to deformation of the tolerance correcting member and deformation of the band member itself, it is possible to absorb fluctuations in tolerance for the tightened body.

Also, since there are no concave/convex sections or holes in an intermediate section of the band member and a tolerance correcting member is attached to an attachment concave section, there is no decrease in strength of the band member, and even if the band member is tightened with a strong tightening force, there are no non-continuous parts in the circumferential direction, so that a sufficient surface pressure can be obtained and the reliability of the tightening can be improved.

In addition, since it is not necessary to carry out a special process to increase the elastic force of the band member, the band member can be cheaply mass produced, and since there are few concave/convex parts in the band member, it is easy to form the ring shape and there is little fluctuation between products in dimensions, such as the band diameter.

BRIEF DESCRIPTION OF THE DRAWINGS

FIG. 3A and FIG. 3B are respectively a plan view and a cross-sectional view in a lengthwise direction of overlapping band parts in a temporarily held state, FIG. 4A and FIG. 4B are respectively a plan view and a cross-sectional view in a lengthwise direction of overlapping band parts in a fixed state.

BEST MODE FOR CARRYING OUT THE INVENTION

Preferred embodiments of the present invention will now be described with reference to the attached drawings. The tightening band according to the present invention will be described for an example of a tightening band that tightens a resin boot covering a joint used in a vehicle.

First, the overall construction of the tightening band will be described with reference to FIG. 1 to FIG. 3.

Figure 2:
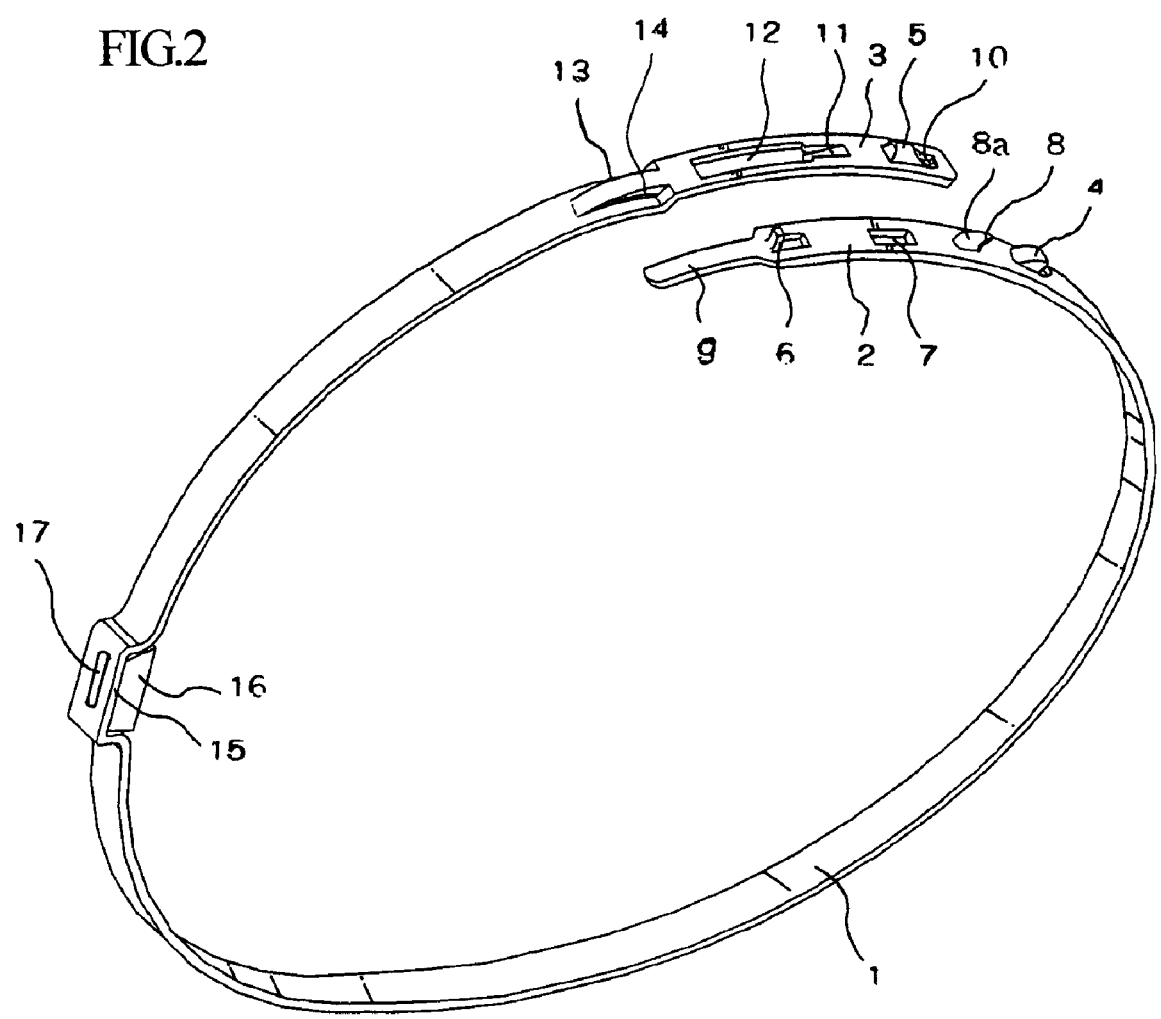
FIG. 2 is a perspective view of a tightening band.

In FIG. 2, the tightening band according to the present invention is constructed so that by overlapping both end sections of a metal strip band member 1 and temporarily holding the band member 1 in a ring shape and then pulling together inner and outer pulling claws 4, 5 formed so as to protrude outward on an inner band section 2 and an outer band section 3 using a tool, the diameter of the band member 1 can be reduced. A stainless steel material (such as SUS301, SUS304, and SUS430) can be favorably used for the band member 1.

Figures 1A, 1B:
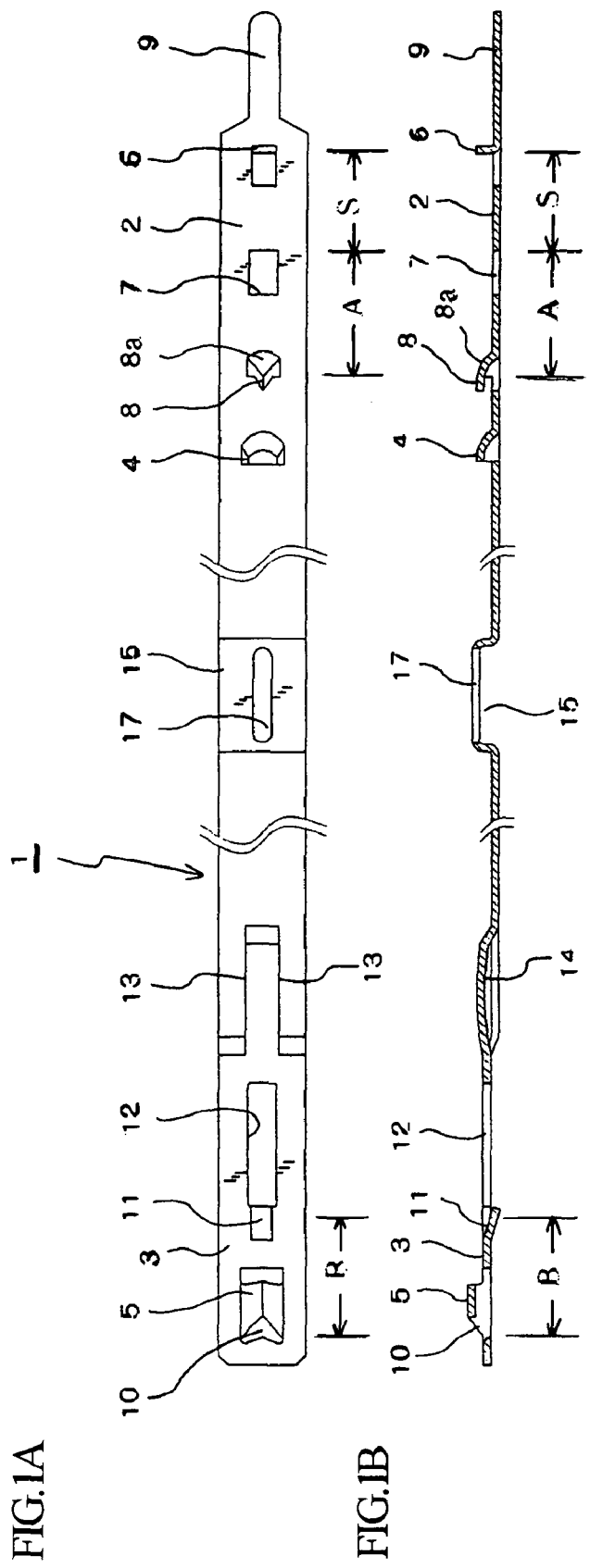
FIG. 1A and FIG. 1B are respectively a plan view and a cross-sectional view in a lengthwise direction of a tightening band.

In FIG. 1A and FIG. 1B, an upright portion 6 formed so as to be upright toward the outside, a stopper receiving hole 7, and a fixing claw 8 are formed in order from an end section side in a part of the inner band section 2 that overlaps the outer band section 3. A tongue-like end section 9 is formed at the end of the inner band.

The upright portion 6 is formed by cutting and bending up at substantially 90 degrees a central section in the width direction of the band member 1 at a position close to a base end section of the tongue-like end section 9 (see FIG. 1B). The stopper receiving hole (through-hole) 7 is formed at a position a predetermined distance from the upright portion 6 away from the band end. A distance S between the upright portion 6 and the stopper receiving hole 7 determines a tightening stroke S of the tightening band. Also, the fixing claw 8 is formed at a position a predetermined distance from the stopper receiving hole 7 away from the band end so as to protrude outward in a dome shape with a rear thereof facing the band end. To engage a fixing hole 10 described later, the fixing claw 8 should preferably be formed so that a surface 8a whose rear faces the band end is R-shaped or tapered so that the band end of the outer band section 3 can easily pass over the fixing claw 8. Also, the inner pulling claw 4 is formed at a position a predetermined distance from the fixing claw 8 away from the band end so as to protrude outward with a rear thereof facing the band end (see FIG. 1B).

In FIG. 1A and FIG. 1B, the fixing hole 10, a tab stopper 11 that is formed so that a tip thereof is inclined toward the inner band section 2, and an elongated hole 12 that guides movement of the upright portion 6 are formed in that order from an end section on a part of the outer band section 3 that overlaps the inner band section 2. The tab stopper 11 is formed by forming cuts in the lengthwise direction in a peripheral part of the outer band end-side of the elongated hole 12 and inclining a tip toward the inner band section 2 (see FIG. 1B). Since the tab stopper 11 is formed in a tab shape, the tab stopper 11 elastically deforms when placed in contact with the inner band section 2.

The fixing hole 10 is a through-hole and is formed at the closest position to the end of the outer band section. The fixing hole 10 engages the fixing claw 8 in a state where the diameter is reduced. The outer pulling claw 5 is formed by causing an edge section that is separated from the band end of the fixing hole 10 to protrude outward (see FIG. 1B). To make the tightening stroke S as small as possible, the outer pulling claw 5 formed in the outer band section 3 should preferably be formed at a position adjacent to the fixing hole 10 close to the outer band end.

Also, the tab stopper 11 is formed at a position a predetermined distance from the outer pulling claw 5. The tab stopper 11 engages the upright portion 6 in the temporarily held state and can prevent the outer band end side from rising. By doing so, the operation of engaging the inner pulling claw 4 and the outer pulling claw 5 with a tool and reducing the diameter is facilitated. The tab stopper 11 engages the stopper receiving hole 7 in the reduced-diameter state. As a result, concentration of the load in the fixing claw 8 provided at a single position is prevented and the tightening load can be distributed, thereby preventing loosening due to spring back and improving the reliability of the tightening. In FIG. 1A the distance A from (the engaging edge side of) the stopper receiving hole 7 to the fixing claw 8 and the distance B from the tab stopper 11 (engaging section) to (the engaging edge side of) the fixing hole 10 are formed so as to be equal.

Also, as the diameter of the band member 1 in the temporarily held state is reduced, from a state where the tab stopper 11 engaged the upright portion 6, the tab stopper 11 contacts the surface of the inner band between the upright portion 6 and the stopper receiving hole 7 and slides while elastically deforming so as to be pressed back upward by the thickness of the plate. On reaching the stopper receiving hole 7, the tab stopper 11 is inserted into and engages the hole due to its own elastic force. Accordingly, unlike the conventional art, there is hardly any damage, such as deformation, of the fixing claw and no abrasion of the fixing claw even after repeated use, so that durability can be improved.

In the temporarily held state, the distance between the inner pulling claw 4 and the outer pulling claw 5 is short, so that even if a tool is not used, it is possible to place the gripper jaws of ordinary pliers in contact with the claw ends to tighten the band, which makes the tightening band easy to use and makes it possible to reduce the manufacturing cost.

In FIG. 1A and FIG. 1B, cuts 13 are provided in parallel with the lengthwise direction in the periphery of the elongated hole 12 on the side away from the band end. The central part in the width direction surrounded by the cuts 13 is caused to protrude outward to form a tongue-like end enclosing section 14. The tongue-like end enclosing section 14 is provided so that when the diameter of the band member 1 is reduced, the tongue-like end section 9 is inserted into the tongue-like end enclosing section 14, thereby absorbing a difference in height between the inner and outer sections.

In addition, an attachment section 15 that protrudes outward in the form of a gantry is provided on part of the band member 1 at a vicinity of a side of the tongue-like end enclosing section 14 away from the band end. In FIG. 2, a tolerance correcting member 16 is bonded to or fitted into the attachment section 15. An elongated hole 17 is provided in the length direction in the protruding surface of the attachment section 15.

The operation of the band overlapping part during a transition between a state where the band member 1 is temporarily held in a ring shape and a state where the diameter has been reduced will now be described with reference to FIG. 3 and FIG. 4.

FIG. 3A and FIG. 3B show the state where the inner band section 2 and the outer band section 3 are temporarily held on one another. When the upright portion 6 of the inner band section 2 is inserted into the elongated hole 12 of the outer band section 3 and the tab stopper 11 engages the upright portion 6, the band member 1 is temporarily held in a ring shape with rising of the outer band end being suppressed.

In FIG. 4A and FIG. 4B, a tool is used to engage and pull together the claw ends of the inner pulling claw 4 and the outer pulling claw 5, so that the upright portion 6 of the inner band section 2 is guided in the elongated hole 12 and moves in a direction away from the outer band end. At this time, the band end of the outer band section 3 passes over the rear surface side of the fixing claw 8 of the inner band section 2, the fixing hole 10 engages the fixing claw 8, and the tab stopper 11 engages the stopper receiving hole 7 while elastically deforming, resulting in the band member 1 being fixed in the reduced-diameter state with the tightening load distributed between the fixing claw 8 and the tab stopper 11.

Next, the behavior of the tolerance correcting member 16 during a transition between the state where the band member 1 is temporarily held in the ring shape and the state where the diameter has been reduced will be described with reference to FIG. 5A and FIG. 5B.

Figure 5A:
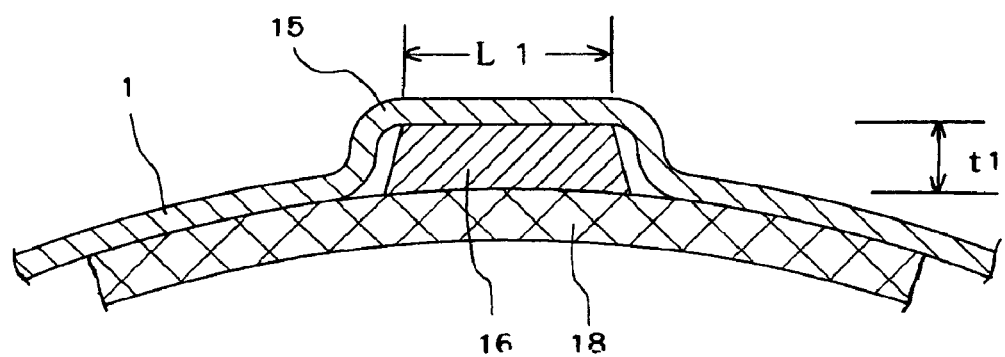
FIG. 5A and FIG. 5B are diagrams showing a tolerance correcting member before and after tightening.
Figure 5B:
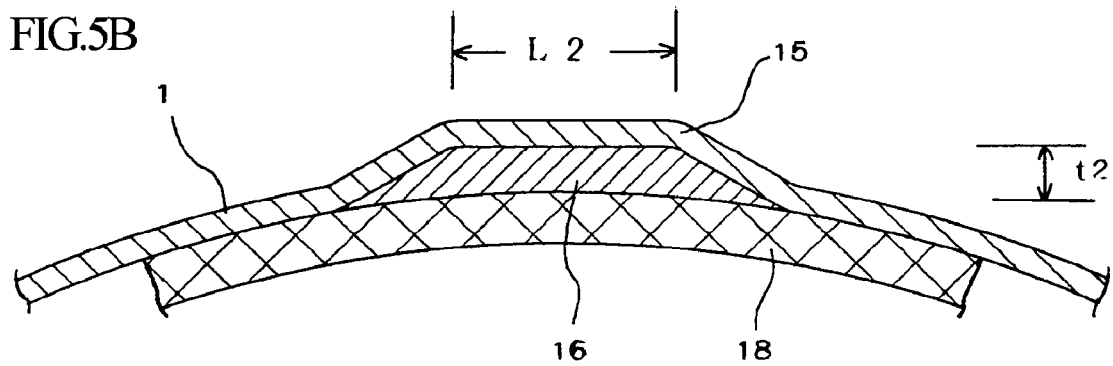

In FIG. 5A, when the band member 1 is fitted onto a resin boot 18, the tolerance correcting member 16 tightly contacts the resin boot 18. The tolerance correcting member 16 is bonded having been fitted into a concave surface section of the attachment section 15 formed in the shape of a gantry. For the tolerance correcting member 16, a weather-resistant resin (for example, neoprene rubber, silicon rubber, or an elastomer) that is as hard as the resin material of the resin boot 18 or softer and is not affected by the usage environment is favorably used.

The diameter of the band member 1 is reduced by clamping and pulling together the inner and outer pulling claws 4, 5 using a tool such as pliers, not shown, until the fixing hole 10 passes over the rear surface of the fixing claw 8. At this time, in FIG. 5B the tolerance correcting member 16 further deforms in the state where tight contact is made with the resin boot 18 in accordance with the collapsing of the attachment section 15 that protrudes in a gantry shape, and the inner and outer band ends return relative to one another in the diameter-increasing direction, thereby applying a restoring force for causing the fixing hole 10 and the fixing claw 8 to engage. More specifically, when the diameter of the band member 1 is reduced, the tolerance correcting member 16 deforms, for example, the tolerance correcting member 16 is stretched to the length L2 (>L1) in the circumferential direction and the thickness of a central part in the circumferential direction is flattened to t2 (<t1). At this time, since the resin boot 18 is comparatively hard and therefore resistant to deformation, there is little reactive force from the resin boot 18 side. As a result, when tightening is carried out with a force that exceeds the elastic region of the band member 1, there is the risk of the band member 1 remaining in the stretched state, resulting in the tightening becoming insufficient. In the present embodiment, the restoring force of the tolerance correcting member 16 deformed by the diameter being reduced and the restoring force due to spring back of the attachment section 15 itself formed in a gantry shape on the band member 1 act together so that the inner and outer band ends reliably spring back in the diameter-increasing direction and the tightened state of the band member 1 can be maintained with the fixing hole 10 and the fixing claw 8 of the band member 1 in strong engagement.

Also, since there is no concave/convex section or hole in an intermediate section of the band member 1, there is no reduction in the strength of the band member 1 and even if the band member 1 is tightened with a strong tightening force, there are no non-continuous sections, so that a sufficient surface pressure can be obtained and the reliability can be improved.

In addition, since it is not necessary to carry out a special process to increase the elastic force of the band member 1, the band member can be cheaply mass produced, and since there are few concave/convex sections in the band member, it is easy to form the ring shape and there is little fluctuation between products in dimensions such as the band diameter.

Figure 6:
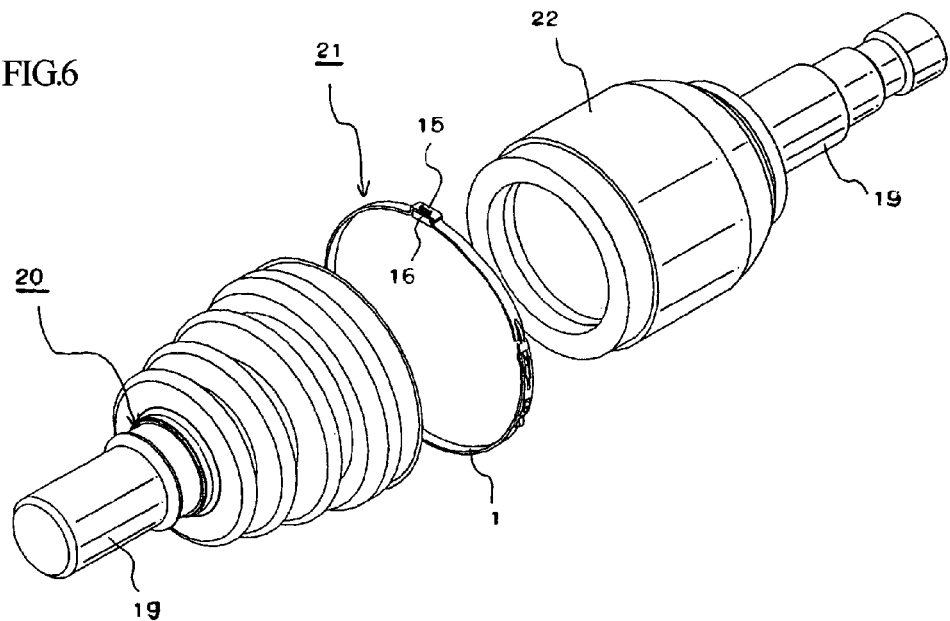
FIG. 6 is a diagram useful in explaining a procedure that tightens a tightening band onto a resin boot.

Next, one example of the operation procedure when attaching and tightening the tightening band on the resin boot 18 will be described with reference to FIG. 6. It should be noted that the tolerance correcting member 16 has been attached to the tolerance correcting member 16 in advance. A tightening band 21 that is temporarily held with a large diameter is fitted onto an outer circumference of a second end of the resin boot 18 that is fixed to a shaft 19 that has been connected to a first joint section at a first end by a tightening band 20 with a small diameter. The first joint section is placed on a second joint section 22 and the other end of the resin boot 18 onto which the large-diameter tightening band 21 has been fitted is fitted onto the joint section 22. The inner and outer pulling claws 4, 5 are clamped and the diameter of the band member 1 is reduced and the fixing hole 10 is caused to engage the fixing claw 8, thereby completing the tightening of the resin boot 18 on the joint section 22.

Figure 7:
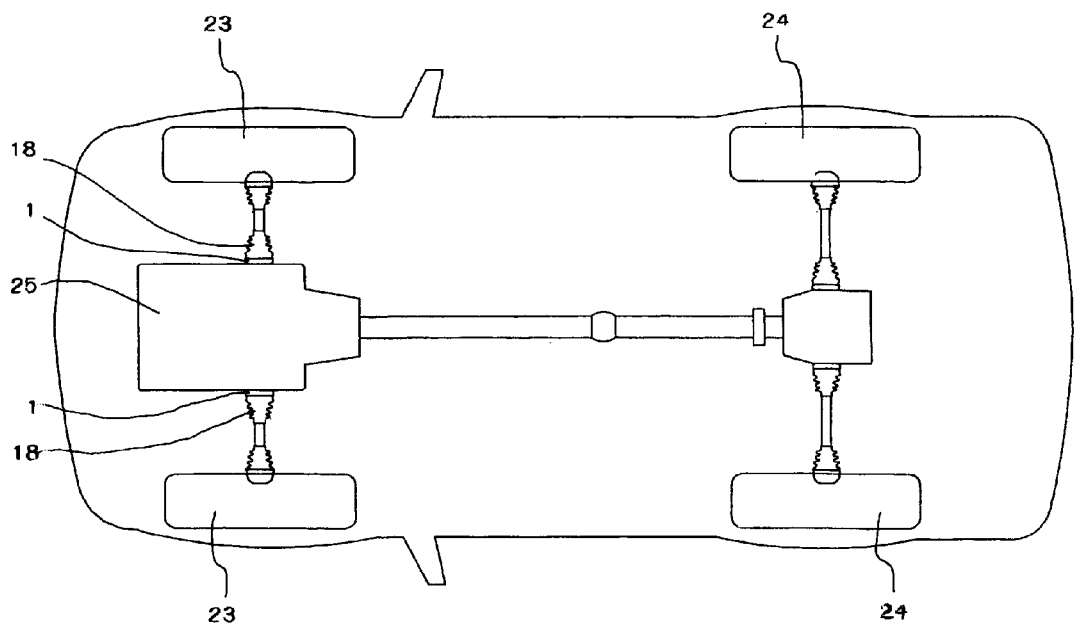
FIG. 7 is a diagram useful in explaining tightening bands attached to a vehicle.

When the tightened object expands and contracts due to changes in environment, the tolerance correcting member 16 has an effect of absorbing and compensating for such changes, so that the required tightening force can always be maintained. In particular, as shown in FIG. 7, by comparing the joint sections on the front wheels 23 and the rear wheels 24 of a vehicle, for example, out of the resin boots 18 attached to the joint sections on the front wheel 23 side, there is a large change in temperature for the resin boots 18 close to the engine between when the engine 25 is operating and is stopped, so that the resin boot 18 repeatedly expands and contracts. As a result, if the resin that is the boot material hardens and deteriorates, the reactive force due to the elastic force is lost, resulting in gradual deterioration in the sealing of the resin boot 18. The tolerance correcting member 16 absorbs the above-described fluctuations over time in the resin boot 18, so that the reactive force required for tightening can always be provided.

The present invention is not limited to the respective embodiments described above, and by freely setting the tightening stroke S, it is possible to provide tightening bands of various sizes from a small diameter to a large diameter that can be widely applied. Also, in place of the tongue-like end section 9, the inner band end may be formed as a forked end, and in accordance with this, concaves that can enclose the forked end may be provided on both sides of the outer band section 3. Also, so long as a restoring force (reactive force) can be applied to the band member 1 whose diameter has been reduced, any material may be used for the tolerance correcting member 16. In addition, the tightened object is not limited to a resin boot covering a constant velocity joint of a vehicle, and may be a resin hose or the like.

The invention claimed is:

1. A tightening band where both end sections of a metal strip band member are overlapped and temporarily held with the tightening band in a ring shape and a diameter of the band member can be reduced by using a tool to pull together inner and outer pulling claws formed on an inner band section and an outer band section so as to protrude outward, wherein an upright portion formed so as to be erected outward, a stopper receiving hole, and a fixing claw are provided in that order from an end section on a part of the inner band section that overlaps the outer band section, a fixing hole, a tab stopper formed so that a tip thereof is inclined toward the inner band section, and an elongated hole that guides movement of the upright portion are provided in that order from an end section on a part of the outer band section that overlaps the inner band section, the upright portion of the inner band section is inserted into the elongated hole in the outer band section and the tab stopper of the outer band section is inserted in a cutout hole on a base end side of the upright portion so that the band member is temporarily held in a ring shape, and the inner and outer pulling claws are pulled together to cause the fixing hole in the outer band section to engage the fixing claw of the inner band section and the tab stopper to engage the stopper receiving hole, thereby fixing the band member in a state where the diameter is reduced.

2. The tightening band according to claim 1, wherein the tab stopper is formed by forming cuts in a lengthwise direction at an edge of the elongated hole on the outer band end side and inclining the tip toward the inner band section.

3. The tightening band according to claim 1, wherein the inner pulling claw is formed so as to protrude outward at a position further from an inner band end than the fixing claw and the outer pulling claw is formed so as to protrude outward between the fixing hole and the tab stopper.

4. The tightening band according to claim 1, wherein clamping end surface sections are formed on the inner and outer pulling claws so as to be substantially parallel with top end surface sections that protrude outward in an arch-like shape.

* * * * *